Oct. 21, 1958  K. D. SAVAGE  2,856,884
DETECTING MEANS FOR LOCATING PIPELINE SCRAPER
Filed July 30, 1956  2 Sheets-Sheet 1
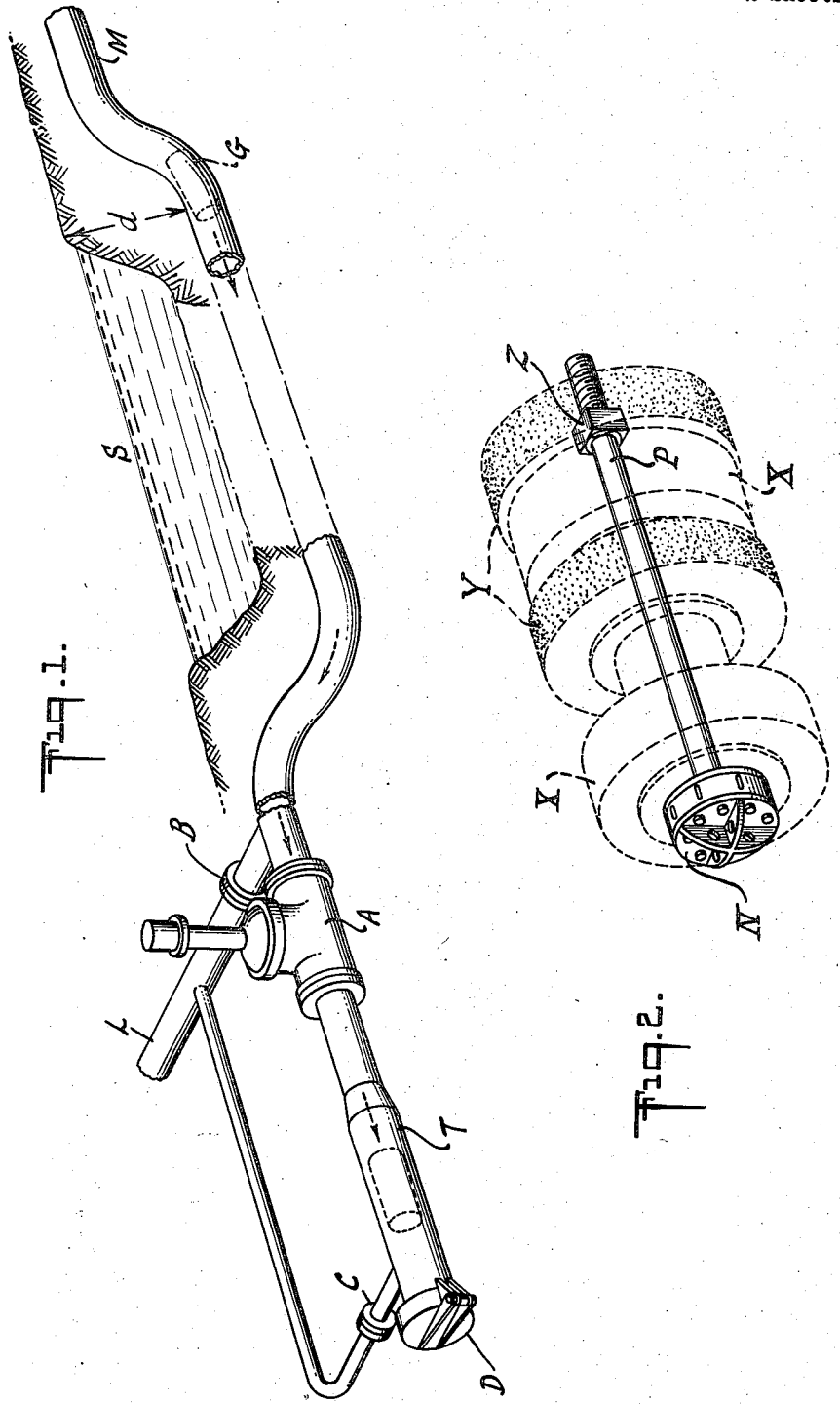

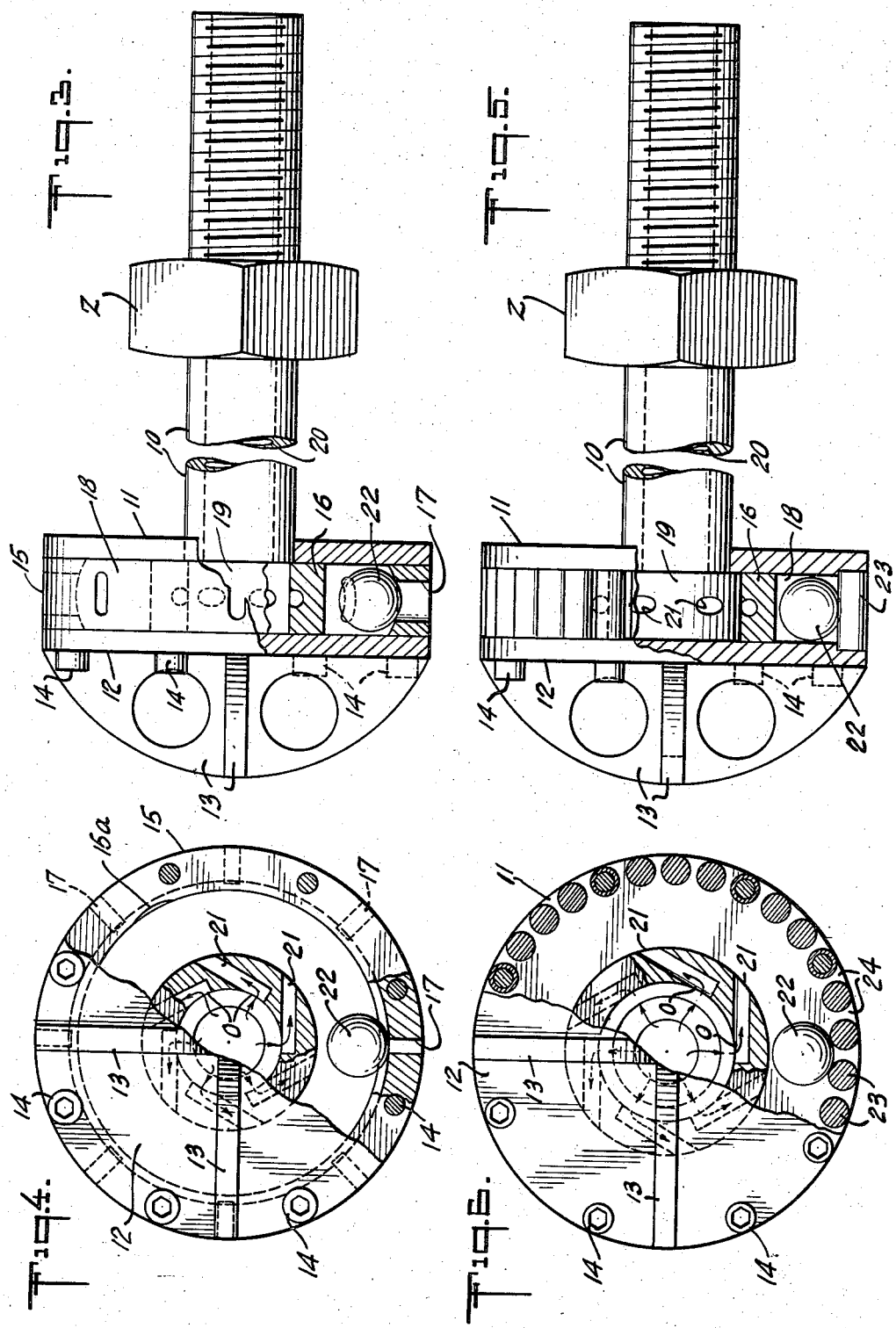

2,856,884

DETECTING MEANS FOR LOCATING PIPELINE SCRAPER

Kerry Dale Savage, Houston, Tex., assignor to The Texas Company, New York, N. Y., a corporation of Delaware Application July 30, 1956, Serial No. 600,793

6 Claims. (Cl. 116—2)

This invention relates generally to fluid carrying pipelines and more particularly concerns a device for the detection of the location of apparatus used in the maintenance of free flow in such pipelines.

Pipelines, carrying either liquids or gases, in time, become obstructed by deposits of sediments which accumulate and block the free flow of the fluids therein. Pipeline scrapers, which have been picturesquely named "godevils" or "pigs," have been used for cleaning pipelines and play an important part in pipeline maintenance, by their removal of wax deposits, corrosive sediment and other foreign materials. Detection of their travels through the pipeline is of great importance especially when the location of a pipeline scraper must be known, should it become stuck.

Since the motivating force for the scraper is furnished by the fluid being pumped through the pipeline, with a rate of flow of from two to four miles per hour, the progress of the scraper may be tracked by field men walking along the pipeline and following the sound arising from friction as the scraper moves through the pipeline. When the sound is lost, either because of the depth of the pipeline below the ground surface or at a stream crossing or the scraper stopping, another scraper is started usually and followed in an attempt to locate the region of stoppage.

Although sound generating devices have been used with moving pipeline scrapers, their efficiency is reduced greatly with the depth of the pipeline below ground level, and should the scrapers get stuck and lack movement in the pipe, no identifying sound is produced. Sound detectors are used also to listen for the scrapers at interval stations but there is no pinpointing of their location when stuck between stations. Among the other methods used for monitoring and locating pipeline scrapers is the insertion of a radiation source, e. g. radioactive isotopes in the scraper, and then to use some suitable detection equipment to locate the position of the scraper. Such a method is limited to the range of radiation detection by the overburden of the pipeline and by the personal health hazard due to the high strength of radiation required, especially at such times as the loading into and unloading of the scraper from the pipeline and when workmen are engaged in "unsticking" such a scraper, as well as the disadvantage of the necessity for highly trained personnel for this type of work.

Accordingly, a primary object of my invention is to provide an improved means for indicating the location of a scraper in a pipeline either when it is moving or when stopped.

Another object of my invention is to provide a simple and inexpensive sound generating means for a pipeline scraper by which its location in a pipeline can be determined accurately.

Still another object of my invention is to provide a simple sonic generator for a pipeline scraper operable either in liquid or gaseous lines and when the scraper is moving or static.

These and other objects, features and advantages of the invention will become apparent from the following description when read in conjunction with the accompanying drawings in which:

Fig. 1 is a diagrammatic view in the vicinity of a scraper trap of a pipeline showing a stuck scraper at a stream crossing;

Fig. 2 is a generalized phantom perspective view of the sound generating means assembled in operative position with a pipeline scraper;

Fig. 3 is an enlarged side view with a partial cross section of one form of the sound generating means;

Fig. 4 is a partially cross sectioned front view of Fig. 3;

Fig. 5 is another side view with a partial cross section of another form of sound generating means; and Fig. 6 is a partially cross sectioned front view of Fig. 5.

The presently disclosed structure comprises the combination of a pipeline scraper with a sonic generator, utilizing the fluid in the pipeline to generate an audible sound when the scraper is either moving or stopped.

Referring to the drawings, Fig. 1 discloses a typical position of a stuck scraper G, such as occurs at a sharp bend as where the pipeline M, is directed under the bed of a stream, indicated at S. While the pipeline is buried only a few feet underground in ordinary cross country situations, at a stream crossing, it lies at a considerable depth, as at d. Because of the shape of the stream banks and the curvature of the pipeline from ordinary ground level to stream bottom level, the amount of the overburden makes it difficult to detect the position of the stuck scraper from its frictional sound or from any radiation source it may carry. The remainder of the disclosure of this figure indicates an incoming scraper trap at T, the outgoing scraper trap being similar.

The description of the operation by which the scraper is removed from the trap follows. When the scraper is about to reach the trap, valve A is opened, followed by opening of the valve C in the bypass line leading to the suction line L which leads to the pump, and then a partial closing of the valve B. The flow of fluid in the main line is diverted through valves A and C and carries the scraper along into the trap. Once it is known that the scraper is in the trap, the valve B is fully opened and the valves C and A are closed consecutively. After the scraper trap has been drained by appropriate means, the hinged closure end at D is opened and the scraper removed. And vice versa, when the scraper trap is used for starting the scraper on its cleaning passage, the valves A and C are closed and the scraper is inserted through the hinged closure end at D. When the closure end has been secured, the valve C is opened slightly followed by opening of the valve A, with a partial closing of the valve B. After the scraper has passed valve A and started on its outgoing passage, the valve B is opened and the valves A and C are closed.

Fig. 2 discloses the sound generating means or device in assembled position with a pipeline scraper shown in conventionalized outline as comprising a noise maker head at N with a threaded pipe extension at P which holds together the elements of the scraper, such as the centering plugs at X, and the scraper units at Y, both indicated in block form, the several elements of the assembly being held together by the nut at Z.

Figs. 3 and 4 disclose respectively side and end views of one form of the sound generating device, which consists of a hollow rod extension, such as a threaded pipe, at 10, which is joined to a rear face plate at 11. The front face plate at 12 carries perforated nose reinforcing flanges spaced 90° apart as indicated at 13, and is joined to the rear face plate by a plurality of fastening means, such as the stud bolts at 14, the face plates being spaced by an outer ring 15 and inner ring 16. These rings may be joined to either face as by welding. The outer ring contains a plurality of slots 17, which communicate with an annular chamber 18, defined by the outer and inner rings 15 and 16.

The inner ring, in turn, defines an inner chamber 19 which communicates with the passage 20 in the hollow rod extension 10. The inner ring 16 contains a plurality of angled passageways 21 which connect the inner chamber 19 with the annular chamber 18, and as shown leave in a direction tangent to the outer periphery of the inner chamber as at 0. The annular chamber 18 contains a metallic means, e. g. a steel ball, indicated at 22, which is inserted into the annular chamber 18 prior to assembly of the nose, through the notch indicated at 15a.

In the operation of the noise maker after assembly with the scraper elements by tightening of the nut Z, because of the differential pressure across the scraper, the fluid in the pipeline enters the passageway 20 of the rod extension 10 and flows into the inner chamber at 19. The fluid is then directed in the form of jets through the angled passageways 21 into the annular chamber 18 so that the fluid strikes the steel ball 22 causing it to rotate into the path of the next jet downstream, resulting in a continuous rotation of the ball. In its passage around the annular chamber, the ball strikes the edges of the plurality of slots through which the fluid passes downstream in the pipeline, and generates noise audible above ground. Since the fluid flowing through the pipeline is diverted through the hollow rod extension and is forced to flow out through the angular passageways and slots downstream, noise is generated whether the scraper assembly either is in motion or stopped.

With respect to the form of the structure disclosed in Figs. 5 and 6, identical elements of the sonic generator bear the same enumeration as in Figs. 3 and 4, with the modification thereover residing in the use of metallic rods 23 in place of the outer ring disclosed at 15, the rods defining passageways 24. The angled jets of fluid leaving the passageways 21 force the steel ball around the annular chamber bouncing it off the metallic rods and generating sound.

Thus, there has been disclosed means by which the position of a pipeline scraper may be located in its travels, whether in static or dynamic status. Minor adaptations may be made for mounting on different types and sizes of scrapers and the device has a particular application to non-metallic pipelines where the frictional noises of the traveling scraper are of such low order as to be barely audible. In those cases where the noise from the device is not audible, e. g. due to the amount of overburden or the like, the use of probes and other listening devices with the disclosed sonic generator is highly effective.

Obviously, many modifications and variations of the invention, as hereinbefore set forth, may be made without departing from the spirit and scope thereof, and therefore only such limitations should be imposed as are indicated in the appended claims.

I claim:

1. Means for locating the position of a scraper in a pipeline comprising in combination therewith a sound generating device having an annular chamber through which fluid from said pipeline is directed thereinto through inlets, and free rolling means within said chamber subjected to the impingement forces of the pipeline fluid directed in jet form through said inlets as said fluid passes through said chamber and generating sonic vibrations while rolling freely around said annular chamber.

2. A device for locating a scraper in a pipeline comprising in combination therewith sound generating means having elements defining an annular chamber with fluid inlets and outlets for passage of pipeline fluid therethrough, and free rolling means retained within said chamber, said fluid inlets being angled with respect to the radii of said annular chamber to impart a directive jet action to the fluid passing through against said free rolling means thereby impelling the retained means and causing a sound to arise as said retained means moves by rolling freely around said annular chamber.

3. A means for locating a pipeline scraper comprising a sonic generator having an annular chamber with directive inlets for providing fluid thereinto in jet form and with a plurality of outlets therefrom, and free rolling means in said annular chamber located adjacent said inlets whereby fluid passing into said chamber in jet form impinges thereagainst and causes said means to roll freely and generate sound during passage over said outlets of said chamber.

4. In combination with a pipeline scraper, a sonic generator comprising a pair of concentric members defining chambers interconnected by a plurality of angled passageways, one of said chambers being disposed annularly with respect to another of said chambers and having a plurality of outlets, a metallic member located in said annular chamber whereby fluid directed from said angled passageways against said metallic member forces the same against the edges of said plurality of outlets.

5. In a sonic generator, a first member defining a chamber and having a plurality of fluid directive outlets therefrom, a second member in spaced relationship to said first member and defining an outer annular chamber therewith having a plurality of fluid outlets and in communication with said first mentioned chamber through said plurality of directive outlets, and free rolling sound producing means retained within said annular chamber, said directive outlets providing jets of fluid for impingement against said free rolling means thereby to impel said free rolling means about said annular chamber, thus generating sound as said free rolling means contacts the edges of the outlets thereof.

6. A sonic generator for a pipeline scraper comprising a nose portion and a hollow rod extension joined thereto, said nose portion comprising a pair of plate members held in spaced apart relationship by a plurality of members thereby defining an inner and outer chamber and having inlets and outlets therefor, the inner chamber opening on said hollow rod extension and having communication with said outer chamber through a plurality of directive passageways serving as inlets into said outer chamber, and free rolling means retained within said outer chamber, whereby directed jets of fluid passing through said rod extension and inner chamber and the inlets to said outer chamber strike successively said free rolling means in jet form and cause noise as said free rolling means is impelled and rolled freely about in said outer chamber.

References Cited in the file of this patent

UNITED STATES PATENTS

| | | |
|---|---|---|
| 1,278,453 | Frank | Sept. 10, 1918 |
| 1,662,429 | Lowy | Mar. 13, 1928 |
| 2,560,728 | Lee | July 17, 1951 |
| 2,601,249 | Brenholdt | June 24, 1952 |
| 2,617,134 | Barton, Jr. | Nov. 11, 1952 |